United States Patent [19]

Ohtani et al.

[11] Patent Number: 4,737,167
[45] Date of Patent: Apr. 12, 1988

[54] METHOD AND APPARATUS FOR SEPARATING GAS MIXTURE

[75] Inventors: Misayo Ohtani, Katsuta; Masaomi Tomomura; Shunsuke Nogita, both of Hitachi; Kazuo Someya, Kudamatsu, all of Japan

[73] Assignee: Hitachi, Ltd., Tokyo, Japan

[21] Appl. No.: 20,179

[22] PCT Filed: Jun. 19, 1984

[86] PCT No.: PCT/JP84/00319
§ 371 Date: Feb. 5, 1985
§ 102(e) Date: Feb. 5, 1985

[87] PCT Pub. No.: WO85/00118
PCT Pub. Date: Jan. 17, 1985

Related U.S. Application Data

[63] Continuation of Ser. No. 705,389, Feb. 5, 1985, abandoned.

[30] Foreign Application Priority Data

Jun. 29, 1983 [JP] Japan .................. 58-115913

[51] Int. Cl.⁴ .................................. B01D 53/04
[52] U.S. Cl. .................................. 55/26; 55/58; 55/62; 55/75; 55/179; 55/387
[58] Field of Search ............ 55/25, 26, 31, 33, 35, 55/58, 62, 68, 74, 75, 179, 180, 387, 389

[56] References Cited

U.S. PATENT DOCUMENTS

| 3,944,400 | 3/1976 | Bird | 55/58 X |
| 4,171,206 | 10/1979 | Sircar | 55/58 X |
| 4,190,424 | 2/1980 | Armond et al. | 55/75 X |
| 4,299,596 | 11/1981 | Benkmann | 55/26 |
| 4,376,639 | 3/1983 | Vo | 55/26 |
| 4,376,640 | 3/1983 | Vo | 55/58 X |
| 4,381,189 | 4/1983 | Fuderer | 55/26 |
| 4,402,712 | 9/1983 | Benkmann | 55/26 |
| 4,519,813 | 5/1985 | Hagiwara et al. | 55/26 |
| 4,529,412 | 7/1985 | Hayashi et al. | 55/25 |

FOREIGN PATENT DOCUMENTS 42-26164 12/1967 Japan.
57-42367 9/1982 Japan.
57-50722 10/1982 Japan.

Primary Examiner—Robert Spitzer
Attorney, Agent, or Firm—Fay, Sharpe, Beall, Fagan, Minnich & McKee

[57] ABSTRACT

The invention relates to separation of a gas mixture for recovering product gas from material gas by a pressure difference adsorption method in which pressurized adsorptive operation and depressurized desorptive operation are repeated in turn. To reduce the length of adsorption zone in adsorption towers (A1, A2, B1, B2, ...) and to restrain disturbance thereof, plural stages of pressure difference adsorption units (UA, UB, UC, ..., UX) are employed so that refined gas or condensed refined gas from the previous pressure difference adsorption unit (UA, UB, UC, ...) is directly introduced (2A, 2B, ...) to the subsequent pressure difference adsorption unit (UB, UC, ..., UX) for separation of the gas mixture. Exhaust gas released from the depressurized desorptive operation in the subsequent pressure difference adsorption unit (UB, UC, ..., UX) is introduced (3B, 5A, 3C, 5B, ...) to the previous or still former pressure difference adsorption unit (UA, UB, UC, ...) for increasing the pressure therein. In particular, the invention is suitable for recovering argon gas and oxygen gas.

6 Claims, 3 Drawing Sheets

METHOD AND APPARATUS FOR SEPARATING GAS MIXTURE

CROSS REFERENCE TO RELATED APPLICATIONS

This patent issued on a continuation application claiming the benefits under 35 U.S.C. 120 of a parent application bearing the same title which was earlier filed on Feb. 5, 1985, and assigned Ser. No. 06/705,389, and which is now abandoned.

TECHNICAL FIELD

The present invention relates to a method and apparatus for separating a gas mixture in which the objective product gas is recovered using the gas mixture containing a plurality of components as material gas by a pressure difference adsorption method adapted to selectively adsorb impurity components in the material gas with adsorbents.

Specifically, the present invention is suitable for the case where impurity components are removed out of various material gases to recover product gas abundant in argon, hydrogen, oxygen, nitrogen, hydrocarbons having the lower boiling point, etc. Background Art Methods and apparatus for separating a gas mixture by a pressure difference adsorption method have been proposed in, for example, Japanese Patent Publication Official Gazette No. 42-26164, No. 57-42367 and No. 57-50722.

Product gas is recovered by making use of a pressure difference adsorption unit which includes adsorption towers each filled with an adsorbent, and in which pressurized adsorptive operation and depressurized desorptive operation are repeated in turn as basic operations. There is arranged a single pressure difference adsorption unit including a plurality of adsorption towers, and material gases having the same composition and the same purity are introduced into the respective adsorption towers in parallel.

Although it is desired to recover product gas of high purity, the length of an adsorption zone in the adsorption tower is enlarged with increasing purity of the gas product. Therefore, an output amount of the product gas per one cycle was reduced and recovery of the product gas was lowered. Particularly, in case of recovering product gas of higher purity, recovery thereof was greatly lowered.

As operation for increasing pressure in the adsorption tower to carry out the pressurized adsorptive operation, there are known a method utilizing material gas and another method utilizing movement of gas remaining in the adsorption tower after completion of the pressurized adsorptive operation. However, because the adsorption zone was largely disturbed due to the increased pressure in the adsorption tower, an output amount of the product gas could not be increased.

In case of recovering argon from material gas with composition of argon 70% and nitrogen 30%, separation of such a gas mixture made by the above-mentioned prior art resulted in argon purity in the product gas as high as 95% and recovery of argon was 63% at maximum. It was impossible to obtain recovered product gas with argon purity exceedingly 95%.

Furthermore, in case of recovering oxygen using air as material gas, oxygen purity in the product gas was 94% and recovery of oxygen had a low level of 67% at maximum.

DISCLOSURE OF INVENTION

It is an object of the present invention to provide a method and apparatus for separating a gas mixture that are capable of recovering product gas at high purity.

Another object of the present invention is to provide a method and apparatus for separating a gas mixture that are capable of recovering product gas at high recovery.

First feature of the present invention is in a method for separating a gas mixture comprising; a first stage pressure difference adsorption cycle step in which pressurized adsorptive operation and depressurized desorptive operation are carried out in turn to separate material gas so that refined gas is recovered and exhaust gas released from the depressurized desorptive operation is discharged out of the system; second and subsequent pressure difference adsorption cycle steps in each of which pressurized adsorptive operation and depressurized desorptive operation are carried out in turn to separate the refined gas so that condensed refined gas is recovered and exhaust gas released from the depressurized desorptive operation is discharged out of the system; and a step for recovering the final condensed refined gas as product gas.

Second feature of the present invention is in an apparatus for separating a gas mixture comprising; a material gas processing pressure difference adsorption unit including an adsorption tower having a material gas inlet port and a refined gas outlet port, the tower being filled with an adsorbent, and exhaust gas discharging means connected to the adsorption tower; and a product gas outputting pressure difference adsorption unit including an adsorption tower having a refined gas inlet port for introducing the refined gas from the material gas processing pressure difference adsorption unit and a product gas outlet port, the tower being filled with an adsorbent, and exhaust gas discharging means connected to the adsorption tower.

The present invention is applicable to the process for recovering product gas in such a manner that various material gases containing a plurality of components are combined with adsorbents for selectively adsorbing impurity components in those material gases to thereby remove the impurity components out of the material gases.

Comparison of adsorption selectivity for various gases with respect to synthetic zeolite 5A (synthetic zeolite having the maximum diameter of 5 Å) as an adsorbent, for example, has resulted in the order of hydrogen < oxygen < nitrogen < carbon monozide < carbon dioxide < moisture. It is to be noted that argon has adsorption selectivity almost equal to that of oxygen.

Accordingly, when the synthetic zeolite 5A is combined with a gas mixture containing the above components as material gas, there can be recovered product gas abundant in hydrogen.

As an alternative, the synthetic zeolite 5A is combined with air mainly consisted of nitrogen and oxygen as material gas, there can be recovered product gas abundant in oxygen. In this case, however, it is difficult to separate oxygen from argon so that oxygen purity is about 95% at maximum.

When the synthetic zeolite 5A is combined with a gas mixture consisted of nitrogen and argon as material gas, there can be recovered product gas abundant in argon.

When an another adsorbent, for example, molecular sieve carbon for separating gases based on the difference in adsorption speeds thereof is combined with air as material gas, there can be recovered product gas abundant in nitrogen.

Furthermore, when activated charcoal is employed an adsorbent and applied to a gas mixture consisted of hydrocarbons such as methane, ethane, propane and butane as material gas, it becomes possible to adsorptively remove hydrocarbons having the higher boiling points and to recover product gas abundant in hydrocarbons having the lower boiling points such as methane and a gas mixture consisted of methane and ethane.

According to the present invention, material gas is separated by the first stage pressure difference adsorption unit to recover refined gas, this refined gas is subsequently introduced into and separated by the second and subsequent pressure difference adsorption units to produce condensed refined gas, and the final condensed refined gas is output as product gas, whereby the length of an adsorption zone in the adsorption tower is shortened and product gas of high purity can be obtained.

Since exhaust gas released from the depressurized desorptive operation is employed for increasing the pressure in the adsorption tower of the previous pressure difference adsorption unit, it becomes possible to achieve effective use of the exhaust gas and restrain disturbance of an adsorption zone in the adsorption tower of the previous pressure difference adsorption unit, whereby product gas of high purity can be recovered at high recovery.

Furthermore, since loss of effective components contained in material gas is small, the gas mixture can be separated economically and an improvement in recovery decreases electric power energy necessary for producing product gas.

BEST MODE FOR CARRYING OUT THE INVENTION

Figure 1:
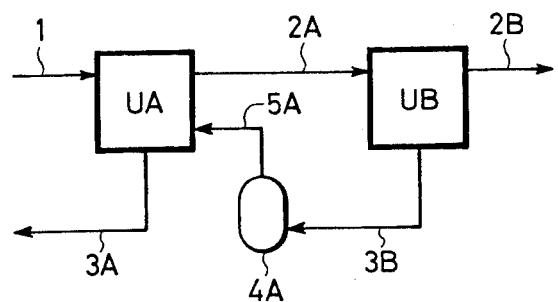
FIG. 1 is a system diagram of a gas mixture separating apparatus using pressure difference adsorption units in two stages according to the present invention.

FIG. 1 shows a system diagram of a gas mixture separating apparatus using pressure difference adsorption units UA, UB in two stages.

Pressurized material gas from a piping 1 is supplied to the first stage pressure difference adsorption unit UA to carry out pressurized adsorption processing. Processed gas (or infrared gas) from the first stage pressure difference adsorption unit UA is then directly supplied to the second pressure difference adsorption unit UB through a piping 2A. The refined gas is subjected once again to pressurized adsorption processing in the second pressure difference adsorption unit UB to produce condensed refined gas, which is then output as product gas through a piping 2B.

Exhaust gas released from a depressurized desorptive operation in the first stage pressure difference adsorption unit UA is discharged out of the system through a piping 3A. Exhaust gas released from a depressurized desorptive operation in the second stage pressure difference adsorption unit UB is returned back to the first stage pressure difference adsorption unit UA through a piping 3B, a reservoir 4A and a piping 5A, and is used for increasing the pressure in an adsorption tower constituting the first stage pressure difference adsorption unit UA after completion of the depressurized desorptive operation.

In the first stage pressure difference adsorption unit UA of a vacuum regenerating system, the final pressure of the depressurized desorptive operation is desirably held low to regenerate an adsorbent in the adsorption tower. To this end, it is important to prolong the discharging time of exhaust gas from the first stage pressure difference adsorption unit UA.

Operation of increasing the pressure in an adsorption tower to carry out the pressurized adsorptive operation in the first stage pressure difference adsorption unit UA is desirably effected in combination with the exhaust gas fed back from the second stage pressure difference adsorption unit UB through the pipings 3B, 5A, with the material gas and with the movement of gas remaining in the adsorption tower after completion of the pressurized adsorptive operation, the combination of the last two being known in the art.

It has been found that coincidence of the time of carrying out the pressurizing operation with the exhaust gas from the second pressure difference adsorption unit UB with the time of carrying out the depressurized desorptive operation in the first stage pressure difference adsorption unit UA results in the excessively large portion of the pressurizing operation in the first stage pressure difference adsorption unit per once cycle or in the excessively small portion of the depressurized desorptive operation in the second pressure difference adsorption unit UB per one cycle, and this will not contribute to improvement in separation efficiency of the gas mixture.

It has been confirmed that the method of storing the exhaust gas flowing from the second stage pressure difference adsorption unit UB through the piping 3B temporarily midway in the passage and then supplying it to the first stage pressure difference adsorption unit UA is able to provide optimum timing for both the pressurizing operation and the depressurized desorptive operation for the purpose of improving efficiency of the gas mixture.

The reservoir 4A in the passage of the exhaust gas from the second stage pressure difference unit UB is provided to fulfill the above purpose. The reservoir is advantageously formed of a vessel variable in its volume in accordance with an amount of exhaust gas.

It is also possible to arrange the process in which the time of carrying out the pressurizing operation is not coincident with the time of carrying out the depressurized desorptive operation without providing a reservoir. In this case, the discharge pressure of a vacuum pump for the second stage pressure difference adsorption unit UB is somewhat increased.

When practicing the present invention, the pressurizing operation in the first stage pressure difference adsorption unit UA is desirably carried out in combination of three steps utilizing (1) the exhaust gas from the second stage pressure difference adsorption unit UB, (2) the movement of gas remaining in the adsorption tower after completion of the adsorption process, and (3) material gas. These steps are usually carried out in the order of (1), (2) and (3).

The pressurizing operation (2) using gas remaining in the tower may be divided into plural steps. In this case of the pressurizing operation divided into plural steps, the pressurizing operation (1) is carried out after pressurizing operation (2) using a part of the residual gas and, thereafter, the pressurizing operations (2) using the remaining gas and (3) using material gas are carried out in this order.

A part of the refined gas produced through the pressurized adsorptive operation in the first stage pressure difference adsorption unit UA may be employed for the pressurizing operation in the unit UA.

In addition to the above, the exhaust gas released from the depressurized desorptive operation in the second stage pressure difference adsorption unit UB is all utilized for increasing the pressure in the adsorption tower of the first stage pressure difference adsorption unit UA while being fed back to the unit UA, it is further possible to discharge a part of the exhaust gas out of the system, which gas is to be partially utilized.

Figure 2:
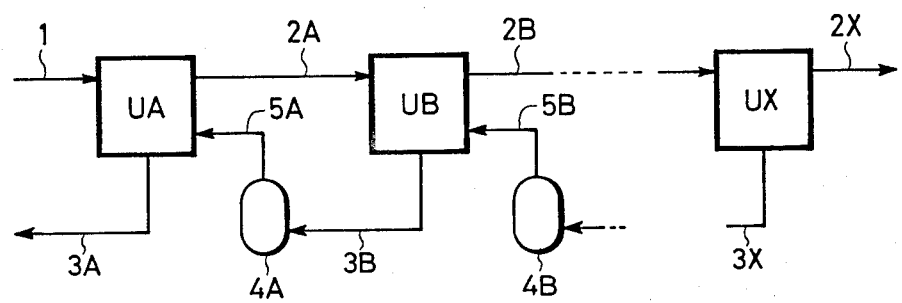
FIG. 2 is a system diagram of a gas mixture separating apparatus using pressure difference adsorption units in three or more stages according to the present invention.

FIG. 2 shows a system diagram of a gas mixture separating apparatus in which pressure difference adsorption units in three or more stages are employed.

In pressure difference adsorption units UA, UB, ..., UX, refined gas from the first stage pressure difference adsorption unit UA is then directly supplied to the second pressure difference adsorption unit UB through a piping 2A, and condensed refined gas from the pressure difference adsorption unit UB, ... of the previous stage is then directly supplied to the pressure difference adsorption unit ..., UX of the subsequent stage through a piping 2B, ... in turn for the second and subsequent pressure difference adsorption unit UB, ..., UX. The final condensed refined gas is output as product gas through a piping 2X extending from the pressure difference adsorption unit UX of the final stage.

As to the adjacent every two pressure difference adsorption units UA, UB, ..., UX, exhaust gas from the pressure difference adsorption unit UB, ..., UX of the subsequent stage is returned back through a piping 3B, ..., 3X, a reservoir 4A, 4B, ... and a piping 5A, 5B, ... and used for increasing the pressure in an adsorption tower in the pressurizing operation in the pressure difference adsorption unit UA, UB, ... of the previous stage.

Such a gas mixture separating apparatus is effective in recovering product gas of higher purity at high recovery.

In the present invention, the exhaust gases from a plurality of subsequent pressure difference adsorption units may be employed for the pressurizing operation in the previous pressure difference adsorption unit.

Figure 3:
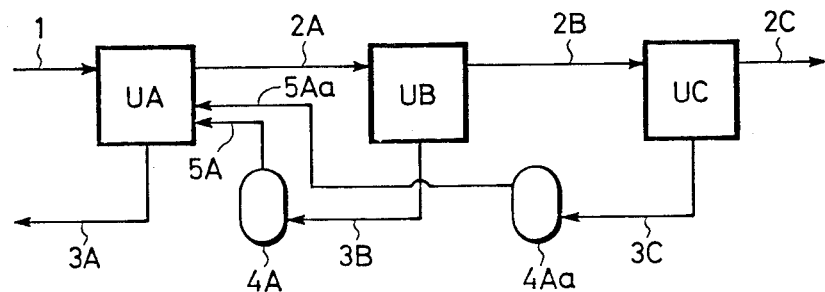
FIGS. 3 and 4 are system diagrams of the gas mixture separating apparatus showing other embodiments of the present invention using pressure difference adsorption units in three stages.

In a gas mixture separating apparatus provided with three pressure difference adsorption units UA, UB and UC as shown in FIG. 3, exhaust gases from the second stage pressure difference adsorption unit UB and the third stage pressure difference adsorption unit UC are returned back through: a piping 3B, a reservoir 4A and a piping 5A, and a piping 3C, a reservoir 4Aa and a piping 5Aa, respectively, to be used for the pressurizing operation in the first stage pressure difference adsorption unit UA.

Figure 4:
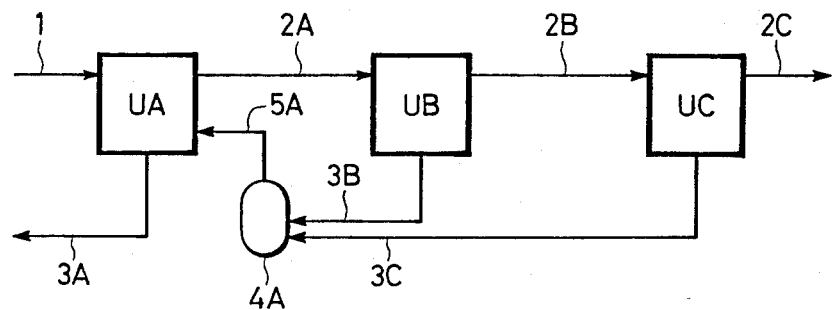

In another gas mixture separating apparatus provided with three pressure difference adsorption units UA, UB and UC as shown in FIG. 4, exhaust gases from the second stage pressure difference adsorption unit UB and the third stage pressure difference adsorption unit UC are introduced into a single reservoir 4A through a piping 3B and a piping 3C, respectively, and then fed back through a piping 5A from the reservoir 4A to be used for the pressurizing operation in the first stage pressure difference adsorption unit UA.

There will now be described a method and apparatus for separating a gas mixture according to one embodiment of the present invention.

Figure 5:
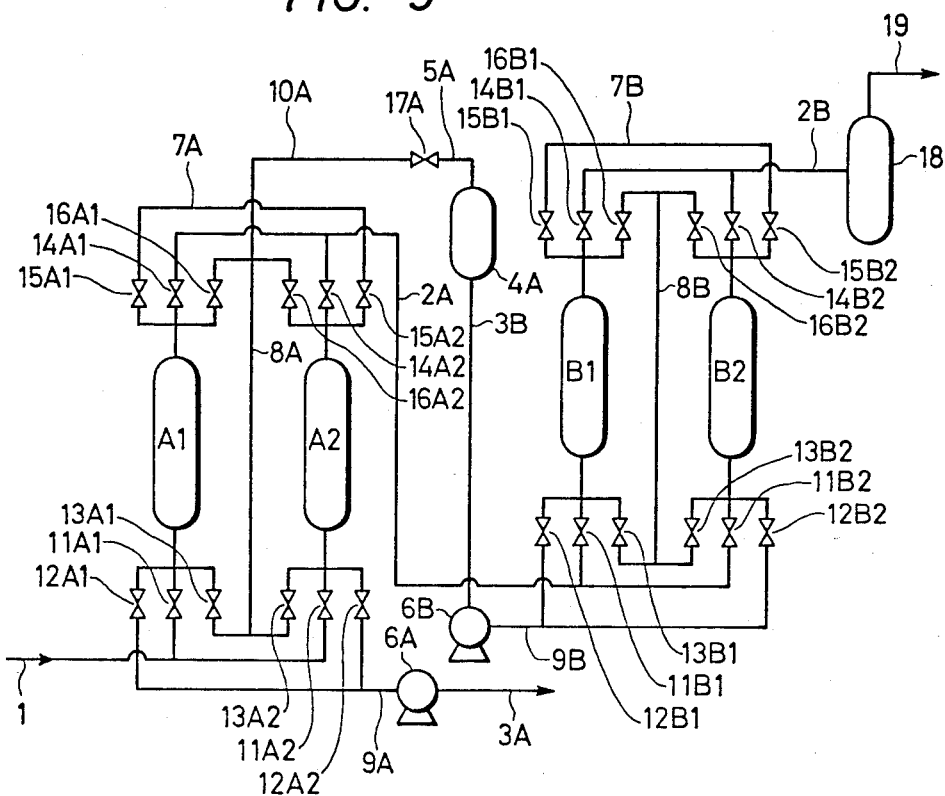
FIGS. 5 and 6 are structural views of gas mixture separating apparatus according to the present invention.

FIG. 5 shows the structure of a gas mixture separating apparatus in which two stages of pressure difference adsorption units each comprising two adsorption towers are employed.

The structure of a first stage pressure difference adsorption unit comprising two adsorption towers A1, A2 will be first described.

The adsorption tower A1 is provided with change-over valves 11A1, 12A1 and 13A1 in lower pipings and with change-over valves 14A1, 14A1 and 16A1 in upper pipings, respectively. the adsorption tower A2 is provided with change-over valves 11A2, 12A1 and 13A2 in lower pipings and with change-over valves 14A2, 15A2 and 16A2 in upper pipings, respectively.

There are further provided a piping 7A for connecting between the upper change-over valves 15A1 and 15A2, a piping 8A for connecting between the upper change-over valves 16A1, 16A2 and the lower change-over valves 13A1, 13A2, a piping 9A for connecting between the lower change-over valves 12A1 and 12A2, a vacuum pump 6A provided at an outlet portion of the piping 9A, and a piping 3A for discharging exhaust gas from the vacuum pump 6A out of the system.

Next, the structure of a second stage pressure difference adsorption unit comprising two adsorption towers B1, B2 will be described.

The adsorption tower B1 is provided with change-over valves 11B1, 12B1 and 13B1 in lower pipings and with change-over valves 14B1, 15B1 and 16B1 in upper pipings, respectively. The adsorption tower B2 is provided with change-over valves 11B2, 12B2 and 13B2 in lower pipings and with change-over valves 14B2, 15B2 and 16B2 in upper pipings, respectively.

There are further provided a piping 7B for connecting between the upper change-over valves 15B1 and 15B2, a piping 8B for connecting between the upper change-over valves 16B1, 16B2 and the lower change-over valves 13B1, 13B2, a piping 9B for connecting between the lower change-over valves 12B1 and 12B2, and a vacuum pump 6B provided at an outlet portion of the piping 9B.

The above-mentioned pressure difference adsorption units in two stages includes a material gas supplying piping 1 led to the first stage pressure difference adsorption unit, a refined gas sending piping 2A for connecting the first stage pressure difference adsorption unit with the second stage pressure difference adsorption unit, and exhaust gas feeding-back piping 3B for feeding exhaust gas released from the depressurized desorptive operation in the second pressure difference adsorption unit back to the first stage pressure difference unit, a reservoir 4A, piping 5A, piping 10A and a change-over valve 17A, a condensed refined gas sending piping 2B for outputting the condensed refined gas from the second stage pressure difference adsorption unit as product gas, a product tank 18 and a piping 19.

The following Table 1 illustrates one example of a pressure difference adsorption cycle for running the gas mixture separating apparatus as shown in FIG. 5.

In the pressurization I-1 step, the refined gas held in the reservoir 4A is supplied to the adsorption tower A1 in the state after completion of the exhaust I step through the piping 5a, change-over valve 17A, piping 10A and the change-over valve 16A1 for increasing the pressure in the adsorption tower A1.

In the pressurization I-2 step, gas remaining in the adsorption tower A2 is supplied to the adsorption tower A1 in the state after completion of the pressurization I-1

TABLE 1

| Time (sec) | 1-st Stage Pressure Difference Adsorption Unit | | 2-nd Stage Pressure Difference Adsorption Unit | |
|---|---|---|---|---|
| | Adsorption Tower A1 | Adsorption Tower A2 | Adsorption Tower B1 | Adsorption Tower B2 |
| 0~40 | Adsorption I | Exhaust I | Pressurization II-2 | Exhaust II |
| 40~70 | Adsorption I | Pressurization I-1 | Adsorption II | Exhaust II |
| 70~90 | Pressure Uniformity I | Pressurization I-2 | Adsorption II | Exhaust II |
| 90~120 | Exhaust I | Pressurization I-3 | Pressure Uniformity II | Pressurization II-1 |
| 120~160 | Exhaust I | Adsorption I | Exhaust II | Pressurization II-2 |
| 160~190 | Pressurization I-1 | Adsorption I | Exhaust II | Adsorption II |
| 190~210 | Pressurization I-2 | Pressure Uniformity II | Exhaust II | Adsorption II |
| 210~240 | Pressurization I-3 | Exhaust I | Pressurization II-1 | Pressure Uniformity II |

As to the first stage pressure difference adsorption unit, the pressurized adsorptive operation is carried out in both the pressurization I-3 step and the adsorption I step, the depressurized desorptive operation in the exhaust I step, the feeding-back pressurizing operation in the pressurization I-1 step, and the intertower pressure uniformalizing operation in the pressure uniformity I step or the pressurization I-2 step, respectively.

As to the second stage pressure difference adsorption unit, the pressurized adsorptive operation is carried out in both the pressurization II-2 step and the adsorption II step, the depressurized desorptive operation is in the exhaust II step, and the intertower pressure uniformalizing operation in the pressure uniformity II step or the pressurization II-1 step, respectively.

The respective steps are as follows run with reference to the adsorption tower A1 for the first stage pressure difference adsorption unit and the adsorption tower B1 for the second stage pressure difference adsorption unit by way of example.

In the adsorption I step, the material gas pressurized up to above the atmospheric pressure is supplied from the piping 1 to the adsorption tower A1 through the change-over valve 11A1 to thereby remove impurity components through adsorption, and refined gas is supplied to the adsorption tower B1 through the change-over 14A1, piping 2A and the change-over valve 11B1.

In the pressure uniformity I step, gas remaining in the adsorption tower A1 after completion of the adsorption I step is supplied to the adsorption tower A2 through a line comprising the piping 7A and the change-over valve 15A2 of a line comprising the piping 8A and the change-over valve 13A2.

In the exhaust I step, gas remaining in the adsorption tower A1 after completion of the pressure uniformity I step is sucked by the vacuum pump 6A through the change-over valve 12A1 and the piping 9A for regenerating the adsorbent therein, and discharge gas from the vacuum pump 6A is exhausted out of the system through the piping 3A.

step through either a line comprising the change-over valve 15A2, piping 7A and the change-over valve 15A1, or a line comprising the change-over valve 16A2, piping 8A and the change-over valve 13A1 for increasing the pressure in the adsorption tower A1.

In the pressurization I-3 step, the material gas pressurized up to above the atmospheric pressure is supplied from the piping 1 to the adsorption tower A1 in the state after completion of the pressurization I-2 step through the change-over valve 11A for increasing the pressure in the adsorption tower A1.

In the adsorption II step, the refined gas from the piping 2A is supplied to the adsorption tower B1 through the change-over valve 11B1 to thereby remove impurity components through adsorption, and condensed refined gas after separation is then supplied as product gas to the product tank 18 through the change-over valve 14B1 and the piping 2B.

In the pressure uniformity II step, gas remaining in the adsorption tower B1 after completion of the adsorption II step is supplied to the adsorption tower B2 through either a line comprising the change-over valve 15B1, piping 7B and the change-over valve 15B2, or a line comprising the change-over valve 16B1, piping 8B and the change-over valve 13B2.

In the exhaust II step, gas remaining in the adsorption tower B1 after completion of the pressure uniformity II step is sucked by the vacuum pump 6B through the change-over valve 12B1 and the piping 9B for regenerating the adsorbent therein, and the discharge gas from the vacuum pump 6B is supplied to the reservoir 4A through the piping 3B.

In the pressurization II-1 step, gas remaining in the adsorption tower B2 after completion of the exhaust II step is supplied to the adsorption tower B1 through either a line comprising the change-over valve 15B2, piping 7B and the change-over valve 15B1, or a line comprising the change-over valve 16B2, piping 8B and the change-over valve 13B1 for increasing the pressure in the adsorption tower B1.

In the pressurization II-2 step, the refined gas from the piping 2A is supplied to the adsorption tower B1 in the state after completion of the pressurization step II-1 step through the change-over valve 11B1 for increasing the pressure in the adsorption tower B1.

According to one embodiment as mentioned above, impurity of the refined gas exhausted from the adsorption tower of the first stage pressure difference adsorption unit was once set to be low as compared with purity of the objective product gas, thereby making it possible to reduce the length of an adsorption zone in the adsorption tower, increase throughput thereof correspondingly and to enlarge an output amount of the refined gas.

The refined gas output from the adsorption tower of the first stage pressure difference adsorption unit is condensed in the adsorption tower of the second stage pressure difference adsorption unit, which has the shortened length of its adsorption zone, to be output as the condensed refined gas of the objective purity, thereby making it possible to easily obtain product gas of high purity.

The exhaust gas from the second stage pressure difference adsorption unit can be all utilized as material for the first stage pressure difference adsorption unit so as to prevent loss of the exhaust gas from the second stage of the pressure difference adsorption unit.

Since gas purity of the exhaust gas from the second stage pressure difference adsorption unit is sufficiently high relative to that of the material gas and such exhaust gas is used for increasing the pressure in the adsorption tower of the first stage pressure difference adsorption unit under vacuum, it becomes possible to restrain disturbance of the adsorption zone in the adsorption tower due to an increase in the pressure at minimum, and to increase an output amount of the refined gas in the adsorption step.

Since the reservoir is utilized to arrange the cycle, the exhaust II step for regenerating the adsorbent in the adsorption tower of the second stage pressure difference adsorption unit to recover the residual gas can be run in a time width different from the pressurization I-1 step for reutilizing the recovered exhaust gas. Thus, the prolonged time width of the exhaust II step results in such merits that the adsorbent can be effectively regenerated and exhaust gas can be sufficiently utilized.

Furthermore, it is important to adjust time zones of the adsorption I step, the pressurization II-2 step and the adsorption II step.

There will now be described another embodiment of the present invention. In this embodiment, the mixture gas separating apparatus as shown in FIG. 5 is used and run with steps which have resulted from further improvement in those of the embodiment mentioned above.

The following Table 2 illustrates one example of the pressure difference adsorption cycle consisted of such improved steps.

TABLE 2

| Time (sec) | 1-st Stage Pressure Difference Adsorption Unit | | 2-nd Stage Pressure Difference Adsorption Unit | |
|---|---|---|---|---|
| | Adsorption Tower A1 | Adsorption Tower A2 | Adsorption Tower B1 | Adsorption Tower B2 |
| 0~30 | Adsorption I-1 | Exhaust I | Pressurization II-2 | Exhaust II |
| 30~50 | Adsorption I-1 | Exhaust I | Adsorption II-1 | Exhaust II |
| 50~70 | Adsorption I-2 | Pressurization I-1 | Adsorption II-1 | Exhaust II |
| 70~80 | Pressure Uniformity I | Pressurization I-2-a | Adsorption II-2 | Exhaust II |
| 80~90 | Pressure Uniformity I | Pressurization I-2-b | Adsorption II-2 | Exhaust II |
| 90~100 | Exhaust I | Pressurization I-3 | Pressure Uniformity II | Pressurization II-1-a |
| 100~120 | Exhaust I | Pressurization I-3 | Pressure Uniformity II | Pressurization II-1-b |
| 120~150 | Exhaust I | Adsorption I-1 | Exhaust II | Pressurization II-2 |
| 150~170 | Exhaust I | Adsorption I-1 | Exhaust II | Adsorption II-1 |
| 170~190 | Pressurization I-1 | Adsorption I-2 | Exhaust II | Adsorption II-1 |
| 190~200 | Pressurization I-2-a | Pressure Uniformity I | Exhaust II | Adsorption II-2 |
| 200~210 | Pressurization I-2-b | Pressure Uniformity I | Exhaust II | Adsorption II-2 |
| 210~220 | Pressurization I-3 | Exhaust I | Pressurization II-1-a | Pressure Uniformity II |
| 220~240 | Pressurization I-3 | Exhaust I | Pressurization II-1-b | Pressure Uniformity II |

The operation method of this embodiment will be described by referring to only the improved steps mainly with regard to the adsorption towers A1, A2 of the first stage pressure difference adsorption unit and the adsorption towers B1, B2 of the second stage pressure difference adsorption unit in FIG. 5.

The adsorption I step is carried out in two stages comprising the adsorption I-1 step in which material gas is supplied from the piping 1 to the adsorption tower A1 through the change-over valve 11A1, while refined gas is sent out through the change-over valve 14A1, and the adsorption I-2 step in which the refined gas is sent out through the change-over valve 14A1 in a state that the change-over valve 11A1 is closed to stop supply of the material gas.

This enables to reduce an amount of gas remaining in the adsorption tower A1 after completion of the adsorption step I on conditions of uniform pressure of the material gas, as a result of which an amount of gas to be discharged out of the system through the piping 3A can be reduced.

As to the pressurization I-2 step, the pressurization I-2-a step is first carried out in which the residual gas in the adsorption tower A2 is supplied to the adsorption tower A1 through the change-over valve 15A2, piping 7A and the change-over valve 15A1, and the pressurization I-2-b step is then carried out in which the residual gas in the adsorption tower A2 is supplied to the adsorption tower A1 through the change-over valve 16A2, piping 8A and the change-over valve 13A1.

This enables to supply the refined gas of relatively high purity to the adsorption tower from one end thereof and the material gas of relatively low purity to the adsorption tower from the other end thereof, thereby contributing to reduce the length of adsorption zone in the adsorption tower of the first stage pressure difference adsorption unit.

The adsorption II step is carried out in two stages comprising the adsorption II-1 step in which the refined gas is supplied from the piping 2A to the adsorption B1 through the change-over valve 11B1, while condensed refined gas is sent out through the change-over valve 14B1, and the adsorption II-2 step in which the condensed refined gas is sent out through the change-over valve 14B1 in a state that the change-over valve 11B1 is closed to stop supply of the refined gas.

This enables to enlarge the degree of freedom in adjusting time zones of the adsorption I step for sending out the refined gas as well as the pressurization II-2 step and the adsorption II step both using the refined gas, thus resulting in much effective use.

As to the pressurization II-1 step, the pressurization II-1-a step is first carried out in which the residual gas in the adsorption tower B2 is supplied to the adsorption tower B1 through the change-over valve 15B2, piping 7B and the change-over valve 15B1, and the pressurization II-1-b step is then carried out in which the residual gas in the adsorption tower B2 is supplied to the adsorption tower B1 through the change-over valve 16B2, piping 8B and the change-over valve 13B1.

This enables to supply the condensed refined gas of relatively high purity to the adsorption tower from one end thereof and the refined gas of relatively low purity to the adsorption tower from the other end thereof, thereby contributing to reduce the length of adsorption zone in the adsorption tower of the second stage pressure difference adsorption unit.

Still another embodiment of a gas mixture separating apparatus according to the present invention will now be described by referring to FIG. 6. This embodiment is so arranged that flow regulators are additionally provided in the pipings of the apparatus shown in FIG. 5.

More specifically, flow regulators 21, 22A, 23A, 24A, 25A, 22B, 23B and 24B such as flow regulating valves or orifices are provided midway the pipings 1, 2A, 7A, 8A, 10A, 2B, 7B and 8B, respectively.

This arrangement allows to adjust flow rates in the adsorption I step, pressurization I-1 step, pressurization I-2 step, pressurization I-3 step, adsorption II step, pressurization II-1 step and the pressurization II-2 step to restrain the maximum speed of gas flowing through the adsorption tower in the respective steps, thereby making it possible to reduce the length of adsorption zone.

It is also possible to dispense with a part of the above-mentioned flow regulators and to run the apparatus while regulating gas flow rates in a part of the steps.

EXAMPLE A

Figure 6:
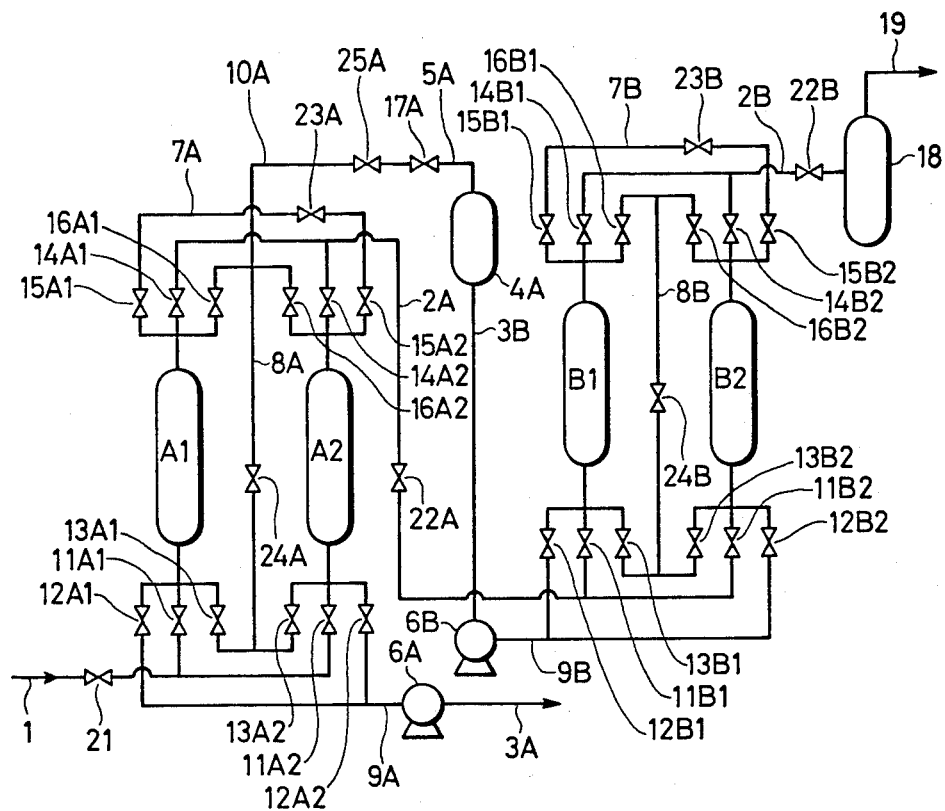

The gas mixture separating apparatus as shown in FIG. 6 was employed and run with the pressure difference adsorption cycle as shown in Table 2.

The adsorption towers A1, A2, B1 and B2 were each formed to have a cylindrical shape, an inner diameter of 38 mm and a filled layer height of 1.7 m, and were filled therein with zeolite 5A. The reservoir 4A and the product tank 18 have inside capacity of 5 l and 2 l, respectively.

Material gas has composition of argon 70% and nitrogen 30%, pressure of 380 kPa and temperature of 20° C.

The arrival pressure in the exhaust I step was 13 kPa and the arrival pressure in the exhaust II step was 11 kPa.

On these conditions, the product gas was output through the piping 19 to measure argon purity thereof, and recovery $\eta$ of argon was determined based on the following equation:

$$\eta = \frac{Qout + Cout}{Qin \times Cin} \times 100 \, (\%)$$

where Qin is an input amount of material gas per one cycle (Nm$^3$), Qout is an output amount of product gas per one cycle (Nm$^3$), Cin is argon purity (%) of material gas, and Cout is argon purity (%) of product gas.

Figure 7:
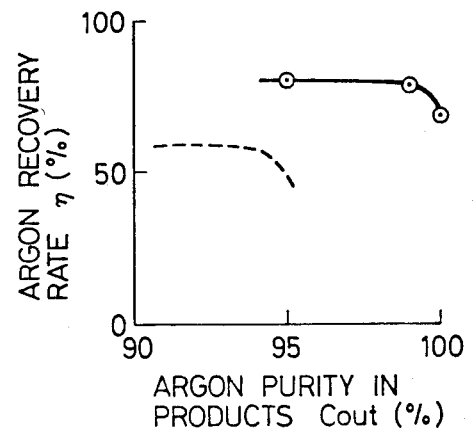
FIG. 7 is a graph showing the relationship between argon purity (Cout) in product gas and argon recovery ($\eta$) for the present invention and prior art when applied to recover argon.

FIG. 7 illustrates the relationship between argon purity (Cout) of the product gas and argon recovery ($\eta$) in a solid line. A dotted line in the figure shows the relationship according to the prior art. Argon recovery exhibited a high value of 78% with argon purity of 99%. Furthermore, even in case of very high argon purity of 99.999%, argon recovery exhibited 68%. As a result, there could be recovered product gas abundant in high purity argon at high recovery.

EXAMPLE B

Air of 250 kPa pressure and 20° C. temperature was used as material gas with the same apparatus and cycle as those in the Example A.

The apparatus was run on such conditions that the arrival pressure in the exhaust I step was 15 kPa and the arrival pressure in the exhaust II step was 14 kPa.

As a result, recovery of oxygen exhibited 73% with oxygen purity in product gas of 95% and, in particular, oxygen recovery was greatly improved as compared with the prior art.

What is claimed is:

1. A method for separating a gas mixture, comprising:
   a first stage pressure difference adsorption cycle step in which a pressurized adsorptive operation and depressurized desorptive operation are carried out in turn to separate material gas so that refined gas is recovered and exhaust gas released from said depressurized desorptive operation is discharged out of the system;
   a second stage pressure difference adsorption cycle step in which a pressurized adsorptive operation and depressurized desorptive operation are carried out in turn to separate said refined gas so that condensed refined gas is recovered and exhaust gas released from said depressurized desorptive operation is discharged out of the system;

said second stage pressure difference adsorption cycle step including an exhaust step in which exhaust gas released from the depressurized desorptive operation in a second pressure difference adsorption cycle is fed back to a first pressure difference adsorption cycle of said first stage pressure difference adsorption cycle step;

recovering said condensed refined gas as product gas;

said first stage pressure difference adsorption cycle step including a step of performing a pressurizing operation through feed-back; and said exhaust gas from said second pressure difference adsorption cycle being stored temporarily in storage means and being returned to said first pressure difference adsorption cycle during said step of feed-back pressurizing operation;

wherein said feed-back exhaust gas held in said storage means is supplied to said first pressure difference adsorption cycle in a step after completion of an exhaust step by pressure difference occurring between said storage means and said first pressure difference adsorption cycle for increasing the pressure in said first pressure difference adsorption cycle;

said first pressure difference adsorption cycle is kept at a vacuum and at a lower pressure than pressure occurring in said storage means; and said feed-back exhaust gas is supplied to said first pressure difference adsorption cycle without assistance of means for compressing a gas.

2. An apparatus for separaring a gas mixture, comprising:

a material gas processing pressure difference adsorption unit including an adsorption tower having a material gas inlet port and a refined gas outlet port, said adsorption tower being filled with an adsorbent, and means for discharging exhaust gas connected to said adsorption tower;

a product gas output pressure difference adsorption unit including an adsorption tower having a refined gas inlet portion for introducing refined gas from said material gas processing pressure difference adsorption unit and a product gas outlet port, said adsorption tower being filled with an adsorbent, and means for discharging exhaust gas connected to said adsorption tower;

exhaust gas feeding-back means for feeding exhaust gas from said exhaust gas discharging means of said product gas output pressure difference adsorption unit back to said adsorption tower of said material gas processing pressure difference adsorption unit;

said material gas processing pressure difference adsorption unit including pressurizing operation means for performing a pressurizing operation through feed-back;

said exhaust gas feeding-back means of said product gas processing pressure difference adsorption unit being connected to a side of said refined gas outlet port of said material gas processing pressure difference adsorption unit to return back said exhaust gas to said material gas processing pressure difference adsorption unit during a step of feedback pressurizing operation performed by said pressurizing operation means; and storage means disposed midway between said exhaust gas feed-back means, for storing temporarily the feed-back exhaust gas;

wherein said feed-back exhaust gas held in said storage means is supplied to said adsorption tower of said material gas processing pressure difference adsorption unit in a step after completion of an exhaust step through a pressure difference between said storage means and said adsorption tower of said material gas processing pressure difference adsorption unit for increasing the pressure in said material gas processing pressure adsorption unit;

means for keeping said adsorption tower of said material gas processing pressure difference adsorption unit at a vacuum and at a pressure lower than pressure occurring in said storage means; and said feed-back exhaust gas is supplied to said adsorption tower of said material gas processing pressure difference adsorption unit without assistance of means for compressing a gas.

3. An apparatus for separating a gas mixture, comprising:

a material gas processing pressure difference adsorption unit including an adsorption tower having a material gas inlet port and a refined gas outlet port, said adsorption tower being filled with an adsorbent, and means for discharging exhaust gas connected to said adsorption tower;

a refined gas processing pressure difference adsorption unit including an adsorption tower having a refined gas inlet port for introducing refined gas from said material gas processing pressure difference adsorption unit and a condensed refined gas outlet port, said adsorption tower being filled with an adsorbent, and means for discharging exhaust gas connected to said adsorption tower;

a product gas output pressure difference adsorption unit including an adsorption tower having a condensed refined gas inlet port for introducing said condensed refined gas from said refined gas processing pressure difference adsorption unit and a product gas outlet port, said adsorption tower being filled with an adsorbent, and means for discharging exhaust gas connected to said adsorption tower;

exhaust gas feeding-back means for feeding exhaust gas from said exhaust gas discharging means of said refined gas processing pressure difference adsorption unit back to said adsorption tower of said material gas processing pressure difference adsorption unit;

said material gas processing pressure difference adsorption unit including means for effecting pressurizing operation through feed-back;

said exhaust gas feed-back means of said refined gas processing pressure difference adsorption unit being connected to a side of said refined gas outlet port of said material gas processing pressure difference adsorption unit to return back said exhaust gas to said material gas processing pressure difference adsorption unit during said step of feed-back pressurizing operation;

said exhaust gas feed-back means for feeding said exhaust gas from said exhaust gas discharging means of said product gas output pressure difference adsorption unit back to either said adsorption tower of said refined gas processing pressure difference adsorption unit or said adsorption tower of said material gas processing pressure difference adsorption unit; and sotrage means for storing temporarily the feed-back exhaust gas and disposed midway between said exhaust gas feed-back means;

wherein said feed-back exhaust gas held in said storage means is supplied to said adsorption tower of said refined gas processing pressure difference adsorption unit or said adsorption tower of said material gas processing pressure difference adsorption unit in a step after completion of an exhaust step through a pressure difference between said storage means and said adsorption tower of said refined gas processing pressure difference adsorption unit or said adsorption tower of said material gas processing pressure difference adsorption unit;

means for keeping said adsorption tower of said refined gas processing pressure difference adsorption unit or said adsorption tower of said material gas processing pressure difference adsorption unit at a vacuum and at a lower pressure than pressure occuring said storage means; and said feed-back exhaust gas is supplied to said adsorption tower of said refined gas processing pressure difference adsorption unit or said adsorption tower of said material gas processing pressure difference adsorption unit without assistance of means for compressing a gas.

4. An apparatus for separating a gas mixture according to claim 3, including a plurality of said refined gas processing pressure difference adsorption units and exhaust gas feeding-back means adapted to feed exhaust gas from said exhaust gas discharging means of each of said refined gas processing pressure difference adsorption units back to said adsorption tower of at least a former one of said plurality of refined gas processing pressure difference adsorption units.

5. An apparatus for separating a gas mixture, comprising:

a material gas processing pressure difference adsorption unit including a plurality of adsorption towers each having a material gas inlet port and a refined gas outlet port, said adsorption towers being filled with an adsorbent, and mans for discharging exhaust gas connected to said adsorption towers, and adsorption tower changing-over control means for controllably changing over said adsorption towers;

a product gas output pressure difference adsorption unit including a plurality of adsorption towers each having a refined gas inlet port for introducing refined gas from said material gas processing pressure difference adsorption unit and a product gas outlet port, said adsorption towers being filled with an adsorbent, means for discharging exhaust gas connected to said adsorption tower, and adsorption tower changing-over control means for controllably changing over said adsorption towers;

exhaust gas feed-back means for feeding exhaust gas from said exhaust gas discharging means of said product gas output pressure difference adsorption unit back to said adsorption tower of said material gas processing pressure difference adsorption unit;

said adsorbents of said plurality of adsorption towers of said material gas processing pressure difference adsorption unit and said adsorbents of said plurality of adsorption towers of said product gas output pressure difference adsorption unit being the same adsorbent, connection means for serially connecting both said material gas processing pressure difference adsorption unit and said product gas output pressure difference adsorption unit being provided therebetween to introduce said refined gas from each said adsorption tower of said material gas processing pressure difference adsorption unit to said refined gas inlet port of each said adsorption tower of said product gas output pressure difference adsorption unit;

said material gas processing pressure difference adsorption unit including means for effecting a pressurizing operation through feed-back; and storage means for storing temporarily the feed-back exhaust gas and disposed midway of said exhaust gas feed-back means;

wherein said feed-back exhaust gas held in said storge means is supplied to one of said adsorption tower of said material gas processing pressure difference adsorption unit in a step after completion of an exhaust step through a pressure difference between said storage means and said one adsorption tower for increasing the pressure in said one adsorption tower;

means for keeping said one adsorption tower at a vacuum and at a lower pressure than pressure in said storage means;

said feed-back exhaust gas being supplied to said one adsorption tower without assistance of means for compressing a gas;

gas remaining in another adsorption tower of said material gas processing pressure difference adsorption unit in the step after completion of said pressurization step in said one adsorption tower through said adsorption tower changingover control means for increasing the pressure in said another adsorption tower; and means for pressurizing said material gas to above the atmospheric pressure, said pressurized material gas being supplied to said one adsorption tower in the step after completion of said pressurization step in said another adsorption tower for increasing the pressure in said one adsorption tower.

6. An apparatus for separating a gas mixture, comprising:

a material gas processing pressure difference adsorption unit including a plurality of adsorption towers each having a material gas inlet port and a refined gas outlet port, said adsorption towers being filled with an adsorbent, and means for discharging exhaust gas connected to said adsorption towers, and adsorption tower changing-over control means for controllably changing over said adsorption towers of said material gas processing pressure difference adsorption unit;

a refined gas processing pressure difference adsorption unit including a plurality of adsorption towers each having a refined gas inlet port for introducing refined gas from said material gas processing pressure difference adsorption unit and a condensed refined gas outlet port, said adsorption towers being filled with an adsorbent, means for discharging exhaust gas connected to said adsorption towers, and adsorption tower changing-over control means for controllably changing over said adsorption towers of said refined gas processing pressure difference adsorption unit;

a product gas output pressure difference adsorption unit including a plurality of adsorption towers each having a refined gas inlet port for introducing refined gas from said material gas processing pressure difference adsorption unit and a product gas outlet port, said adsorption towers being filled with an adsorbent, means for discharging exhaust gas connected to said adsorption tower, and adsorption tower changing-over control means for controllably changing over said adsorption towers of said product gas output pressure difference adsorption unit;

exhaust gas feed-back means for feeding exhaust gas from said exhaust gas discharging means of said product gas output pressure difference adsorption unit back to said adsorption tower of said material gas processing pressure difference adsorption unit, or to feed exhaust gas from said exhaust gas discharging means of said product gas output pressure difference adsorption unit back to either said adsorption towers of said material gas processing pressure difference adsorption unit or said adsorption towers of said refined gas processing pressure difference adsorption unit;

said adsorbents of said plurality of adsorption towers of said material gas processing pressure difference adsorption unit and said adsorbents of a plurality adsorption towers of said product gas output pressure difference adsorption unit being the same adsorbent, first connection means for serially connecting both said material gas processing pressure difference adsorption unit and said refined gas output pressure difference adsorption unit being provided therebetween to introduce said refined gas from each said adsorption tower of said material gas processing pressure difference adsorption unit to said refined gas inlet port of each said adsorption tower of said refined gas output pressure difference adsorption unit;

said exhaust gas feed-back means for feeding said exhaust gas from said exhaust gas discharging means of said product gas output pressure difference adsorption unit back to either said adsorption tower of said refined gas processing pressure difference adsorption unit or said adsorption tower of said material gas processing pressure difference adsorption unit; and storage means for storing temporarily the feed-back exhaust gas, disposed midway between said exhaust gas feed-back means;

wherein said feed-back exhaust gas held in said storage means is supplied to one of said adsorption towers of said material gas processing pressure difference adsorption unit in the state after completion of an exhaust step through pressure difference between said storage means and said one adsorption tower for increasing the pressure in said one adsorption tower;

means for keeping said one adsorption tower at a vacuum and at a lower pressure than that of said storage means;

said feed-back exhaust gas is supplied to said one adsorption tower without assistance of means of compressing a gas;

gas remaining in another adsorption tower of said material gas processing pressure difference adsorption unit in the step after completion of said pressurization step in said one adsorption tower through said adsorption tower changing-over control means for increasing the pressure in said another adsorption tower; and means for pressurizing said material gas to above atmospheric pressure, said pressurized material gas being supplied to said one adsorption tower in the step after completion of said pressurization step in said another adsorption tower for increasing the pressure in said one adsorption tower.

* * * * *